United States Patent
Brengartner et al.

(10) Patent No.: US 10,895,489 B2
(45) Date of Patent: Jan. 19, 2021

(54) METHOD FOR MONITORING THE CONDITION OF AN ELECTROMECHANICAL RESONATOR

(71) Applicant: Endress+Hauser SE+Co. KG, Maulburg (DE)

(72) Inventors: Tobias Brengartner, Emmendingen (DE); Manuel Sautermeister, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 124 days.

(21) Appl. No.: 16/344,495

(22) PCT Filed: Sep. 11, 2017

(86) PCT No.: PCT/EP2017/072769
§ 371 (c)(1),
(2) Date: Apr. 24, 2019

(87) PCT Pub. No.: WO2018/077522
PCT Pub. Date: May 3, 2018

(65) Prior Publication Data
US 2019/0242739 A1    Aug. 8, 2019

(30) Foreign Application Priority Data

Oct. 25, 2016   (DE) .................. 10 2016 120 326

(51) Int. Cl.
*G01F 23/296*     (2006.01)
*G01F 25/00*      (2006.01)

(52) U.S. Cl.
CPC ...... *G01F 23/2967* (2013.01); *G01F 25/0061* (2013.01); *G01F 25/0076* (2013.01)

(58) Field of Classification Search
CPC .. G01F 23/2962; G01F 23/284; G01F 23/296; G01F 23/2961; G01F 23/2967;
(Continued)

(56) References Cited

U.S. PATENT DOCUMENTS 3,513,356 A * 5/1970 Newell .................. H03H 3/013
                                                            257/418
4,553,060 A * 11/1985 Domino .................. H03H 9/24
                                                            310/321
(Continued)

FOREIGN PATENT DOCUMENTS

CN       101842687 A    9/2010
DE       10050299 A1    4/2002
(Continued)

OTHER PUBLICATIONS

Search Report for German Patent Application No. 10 2016 120 326.2, German Patent Office, dated Jun. 28, 2017, 5 pp.
(Continued)

*Primary Examiner* — Andre J Allen
(74) *Attorney, Agent, or Firm* — Christopher R. Powers; Endress+Hauser (USA) Holding Inc.

(57) ABSTRACT

The present disclosure includes a method for monitoring the condition of a component of an electromechanical resonator having a piezoelectrical element which can be excited to mechanical vibration using an electrical excitation signal and the mechanical vibrations of which can be received in the form of an incoming electrical signal. The method steps performed at a first point and a second point in time, including determining an amplification factor of the electromechanical resonator, determining a mechanical quality resonator, and establishing an electromechanical efficiency resonator at least from the amplification factor and the mechanical quality. A change over time in the electromechanical efficiency is calculated from the first point to the
(Continued)

second point in time, the change over time in the electromechanical efficiency is compared with a pre-definable threshold, and a condition indicator is determined from the comparison.

13 Claims, 2 Drawing Sheets

(58) Field of Classification Search
CPC ............ G01F 25/0061; G01F 23/2968; G01F 23/2965; G01F 23/2966; G01F 23/0061; G01F 23/0069; G01F 23/28; G01F 23/0007; G01F 23/0076; G01F 23/00; G01F 23/0046; G01F 23/22; G01F 23/26; G01F 22/00; G01F 23/0015; G01F 23/241; G01F 23/261; G01F 23/263; G01F 23/268; G01F 23/64; G01F 1/74; G01F 23/0053; G01F 23/20; G01F 23/265; G01F 23/266; G01F 23/282; G01F 23/2845; G01F 23/292; G01F 23/2921; G01F 23/2963; G01F 23/30; G01F 23/303; G01F 23/363; G01F 25/0007; G01F 25/0076
See application file for complete search history.

(56) References Cited

U.S. PATENT DOCUMENTS

| | | | | |
|---|---|---|---|---|
| 2011/0063052 | A1* | 3/2011 | Steeneken | H03H 9/02433 |
| | | | | 333/195 |
| 2015/0102860 | A1* | 4/2015 | Toriumi | H03L 7/1974 |
| | | | | 331/34 |
| 2017/0038491 | A1* | 2/2017 | Gonzalez | G01N 11/16 |
| 2019/0323338 | A1* | 10/2019 | Seren | E21B 23/10 |
| 2019/0339107 | A1* | 11/2019 | D'Angelico | G01N 9/002 |
| 2020/0264087 | A1* | 8/2020 | Berlinger | G01N 9/002 |

FOREIGN PATENT DOCUMENTS

| | | |
|---|---|---|
| DE | 10057974 A1 | 5/2002 |
| DE | 102005015547 A1 | 10/2006 |
| DE | 102005036409 A1 | 2/2007 |
| DE | 102006033819 A1 | 1/2008 |
| DE | 102006034105 A1 | 1/2008 |
| DE | 102007013557 A1 | 2/2008 |
| DE | 102007043811 A1 | 3/2009 |
| DE | 102009026685 A1 | 12/2010 |
| DE | 102009028022 A1 | 2/2011 |
| DE | 102010030982 A1 | 1/2012 |
| DE | 102015101891 A1 | 8/2016 |
| EP | 2801799 A1 | 11/2014 |
| WO | 2006042786 A2 | 4/2006 |
| WO | 2009057535 A1 | 5/2009 |
| WO | 2016096242 A1 | 6/2016 |
| WO | 2016128217 A1 | 8/2016 |
| WO | 2016134915 A1 | 9/2016 |

OTHER PUBLICATIONS

International Search Report for Patent Application No. PCT/EP2017/072769, WIPO, dated Nov. 20, 2017, 15 pp.

* cited by examiner

METHOD FOR MONITORING THE CONDITION OF AN ELECTROMECHANICAL RESONATOR

CROSS-REFERENCE TO RELATED APPLICATIONS

The present application is related to and claims the priority benefit of German Patent Application No. 10 2016 120 326.2, filed on Oct. 25, 2016 and International Patent Application No. PCT/EP2017/072769, filed on Sep. 11, 2017 the entire contents of which are incorporated herein by reference.

TECHNICAL FIELD

The present invention relates to a method for monitoring the condition of at least one component of an electromechanical resonator with at least one piezoelectric element.

BACKGROUND

Vibronic sensors are often used in process and/or automation technology. In the case of fill-level gauges, the mechanically-vibrating unit is frequently present in the form of a tuning fork, a single rod, or a diaphragm. In the case of flowmeters, the mechanically-vibrating unit can also be designed as a vibrating pipe through which the respective medium flows—for example, in a measuring instrument operating according to the Coriolis principle. In continuous operation, a drive/receiver unit in the form of an electromechanical converter unit excites the mechanically-vibrating unit to mechanical vibration, which, in the case of the present application, comprises at least one piezoelectric element.

Corresponding field instruments are manufactured by the applicant in a large variety and, in the case of fill-level gauges, are sold under the names, LIQUIPHANT or SOLIPHANT, for example. The underlying measurement principles are known in principle from numerous publications. The drive/receiver unit excites the mechanically-vibrating unit to mechanical vibration by means of an electrical excitation signal. Conversely, the drive/receiver unit can receive the mechanical vibrations of the mechanically-vibrating unit and convert them into an incoming electrical signal. Accordingly, the drive/receiver unit is either a separate drive unit and a separate receiver unit, or a combined drive/receiver unit. In many cases, the drive/receiver unit is part of a fed-back, electrical oscillation circuit, by means of which the mechanically-vibrating unit is excited to mechanical vibration. For example, for a resonant vibration, the oscillation circuit condition, according to which the sum of all amplifications in the oscillation circuit or the amplification factor is $\geq 1$, and all phases arising in the oscillation circuit result in a multiple of 360°, must be fulfilled.

In order to excite the vibronic sensor and thus fulfill the oscillation circuit condition, a certain phase shift between the excitation signal and the incoming signal must be guaranteed. For this reason, a pre-definable value for the phase shift, i.e., a setpoint value for the phase shift between the excitation signal and the incoming signal, is frequently set. For this purpose, a wide variety of solutions from the state of the art, with both analog and digital methods, has become known. For example, a pre-definable phase shift is often set using a suitable filter, or the respective phase shift present is controlled to a pre-definable phase shift—the setpoint value—by means of a control loop. In this regard, the use of an adjustable phase shifter has become known from DE102006034105A1. By contrast, the additional integration of an amplifier with an adjustable amplification factor for the additional control of the vibration amplitude was described in DE102007013557A1. According to DE102005015547A1, an all-pass filter is, in turn, used. The setting of a phase shift between the excitation and the incoming signal on the basis of the respective frequency present of the incoming signal is also possible by means of a so-called "frequency search," as disclosed, for example, in DE102009026685A1, DE102009028022A1, and DE102010030982A1, or by means of a phase-locked loop (PLL), as described in DE102010030982A1.

In principle, with a vibronic sensor, both the excitation signal and the incoming signal are characterized by their frequency f, amplitude A, and/or phase $\phi$. Accordingly, changes in these variables are typically used to determine the respective process variable, such as a specified fill-level, flow rate, density, and/or viscosity. In the case of a vibronic level switch for liquids, for example, a distinction is made between whether the vibrating unit is covered by the liquid or vibrates freely. These two states, the free state and the covered state, are distinguished, for example, by different resonance frequencies, i.e., a frequency shift, in the presence of a pre-definable phase shift between the excitation signal and the incoming signal. The density and/or viscosity, in turn, can only be determined with such a measuring instrument if the vibrating unit is covered by the medium. Vibronic sensors suitable for determining the density and/or viscosity and corresponding measurement principles are known, for example, from the documents, DE10057974A1, DE102006033819A1, DE10050299A1, and DE102007043811A1.

In many fields of application for electromechanical resonators or in many applications of electromechanical resonators, it is important that the respective electromechanical resonator carry out mechanical vibrations that remain as constant and uniform as possible. However, a temporal change in the vibration behavior that occurs can have various causes. Especially for electrochemical resonators, which are used in the context of a measuring instrument, the measuring principles themselves frequently cause a change in the vibration behavior as a result of a measurement. For a measuring instrument for determining and/or monitoring a fill-level, a reduction of the vibration amplitude, and/or a change in the vibration frequency occurs—for example, when the vibrating unit contacts the respective medium.

However, there are also many other causes for a change in vibration behavior, e.g., a defect in at least one component of the electromechanical resonator or the like. Thus, it can be arbitrarily difficult to distinguish a change in the vibration behavior caused by measurement technology from another cause for such change.

SUMMARY

The present invention is based upon the aim of providing an option with which the problem described above can be solved.

This aim is achieved by the method according to the invention for monitoring the condition of at least one component of an electromechanical resonator according to claim 1 and by the device for determining and/or monitoring at least one process variable of a medium, which is suitable for carrying out at least one embodiment of the method according to the invention.

An electromechanical resonator, for which the method according to the invention can be used, comprises at least one piezoelectric element. The electromechanical resonator can also be excited to mechanical vibration by means of an electrical excitation signal, and its mechanical vibration can be received in the form of an incoming electrical signal.

In accordance with the method according to the invention, at least the following method steps are carried out at a first and at least a second point in time:

a) Determining an amplification factor of the electromechanical resonator,
b) Determining a mechanical quality of the electromechanical resonator; and
c) Establishing an electromechanical efficiency of the electromechanical resonator at least from the amplification factor and the mechanical quality.

Furthermore, the method according to the invention includes calculating a change over time in the electromechanical efficiency by comparing at least the electromechanical efficiency determined at the first point in time and the electromechanical efficiency determined at the second point in time. The calculated change over time in electromechanical efficiency is then compared with a pre-definable threshold for the change in electromechanical efficiency, and a condition indicator is determined from the comparison.

In principle, electromechanical efficiency is a measure of the quality of the electromechanical transformation (to be distinguished from the mechanical quality of the mechanical vibration)—for example, the piezoelectric effect. It is a dimensionless variable that is related to the ability of the piezoelectric element to convert electrical energy into mechanical energy. Typical values for the electromechanical efficiency k of a resonantly operated electromechanical resonator of a vibronic sensor are k=0.25–0.5. In the event that the resonator element does not carry out any resonance vibrations, the electromechanical efficiency is significantly reduced.

The electromechanical efficiency is influenced by different variables that are dependent upon the respective electromechanical resonator, especially constants, such as the piezoelectric coupling factors, which indicate the degree of the piezoelectric effect as a function of the respective mode of vibration of the piezoelectric body, or the permittivity of the piezoelement, which in turn constitutes a measure of its polarizability.

Advantageously, a condition indicator may be determined from a change over time in electromechanical efficiency using the method according to the invention. The condition indicator preferably is a variable that can be used to make a statement regarding the condition of at least one component of the electromechanical resonator, or is the statement itself. For example, it may be a statement regarding the vibration behavior of the electromechanical resonator or a statement related to the vibration behavior. In the case of an electromechanical resonator used for a measuring instrument, for example, it is advantageous to distinguish between a change in the vibration behavior caused by measurement technology and a change in the same due to another cause. A change in the vibration behavior caused by the resonator itself can greatly distort the respective measurement results. Accordingly, a high measuring accuracy can also, advantageously, be guaranteed by the method according to the invention. If a change in the vibration behavior caused by the electromechanical resonator itself is detected, the resonator or at least one component of the resonator can be checked and replaced, or repaired if necessary.

According to one embodiment of the method according to the invention, the condition indicator is a measure for an aging of the at least one component and/or for a change, especially, one caused by the aging of the at least one component, in a vibration amplitude and/or a resonance frequency of the electromechanical resonator. In the preferred case, in which such component constitutes the piezoelectric element of the electromechanical resonator, aging is caused by, among other things, a continuous decrease in the remanent polarization of the material of such element. After polarization, the material tries to regain its natural, non-deformed lattice state. The extent or reinforcement of such aging processes strongly depends upon the use of the respective piezoelectric material and is usually indicated in the form of a dimensionless logarithmic degradation of characteristic data of the material.

One embodiment of the method provides that the amplification factor be determined from the ratio, especially the magnitude ratio, of the excitation signal, especially an excitation voltage, and of the incoming signal, especially a received voltage. In principle, the amplification factor describes the ratio between the amplitudes of the excitation signal and the incoming signal.

It is advantageous if the electromechanical resonator is excited to resonance vibrations at a resonance frequency. Accordingly, the amplification factor is also determined—preferably, in the case of a resonant vibration of the electromechanical resonator.

It is also advantageous if, for exciting the electromechanical resonator, a pre-definable phase shift between the excitation signal and the incoming signal is set. Preferably, the phase shift is selected in such a manner that the oscillation circuit condition is fulfilled. In this case, there is a resonant vibration of the electromechanical resonator.

One embodiment of the method provides that the mechanical quality be determined on the basis of a gradient of a phase shift between the excitation signal and the incoming signal as a function of a frequency in the presence of a resonance vibration with the resonance frequency. The mechanical quality of the electromechanical resonator, also known as the quality factor, Q-factor, or resonance sharpness, is a measure of the damping or energy loss of the mechanical vibrations of the electromechanical resonator. A high quality is synonymous with a low degree of damping.

With regard to the determination of the mechanical quality, reference is made to the previously unpublished German patent application with file number 102016112743.4, in which a method for determining the damping on the basis of the gradient of a phase curve is described. The mechanical quality can be easily determined from the damping. Furthermore, it has become known in this regard from German patent application DE10050299A1 that the viscosity of a medium is calculated on the basis of the gradient of the phase between the excitation signal and the incoming signal.

An alternative embodiment of the method provides that the mechanical quality is to be determined on the basis of the temporal course of the amplitude of the incoming signal after the excitation signal has been switched off. DE102007043811A1 proposed a measurement of the temporal course of the amplitude of the incoming signal after switching off the excitation signal. In addition, in the previously unpublished German patent application with file number 102016112743.4, it became known that the damping or a variable dependent upon the damping is derived from the decay behavior, and that the density and/or viscosity can then be determined on the basis of the damping. Once again, the mechanical quality can be easily determined from the damping.

Finally, an additional alternative embodiment of the method provides that the mechanical quality be determined on the basis of a modulation of the excitation signal. The manner with which the damping can be determined on the basis of a modulation of the excitation signal has been described in detail in the previously unpublished German patent application with file number 102015101891.8. With this method, it is, advantageously, sufficient to set only one pre-definable phase shift between the excitation signal and the incoming signal, which corresponds to an excitation of the sensor at a single frequency.

In the following, full reference is made to all four patent applications mentioned with regard to the determination of the mechanical quality or with regard to the determination of the damping.

According to one embodiment in which the electromechanical resonator comprises a mechanically-vibrating unit that is connected to the piezoelectric element in a force-fitting and/or firmly-bonded manner, an aging of the piezoelectric element and/or an adhesive, by means of which adhesive the piezoelectric element is fastened to the vibrating unit, is derived from a change in the electromechanical efficiency in excess of the pre-definable threshold.

For this embodiment, the mechanically-vibrating unit is, advantageously, a diaphragm, a single rod, or a tuning fork.

In an additional embodiment of the method, at least one process variable of a medium in a container, especially a pre-definable fill-level, the density, or the viscosity of the medium, is determined at least on the basis of the incoming signal.

One embodiment of the method according to the invention involves the ambient temperature being determined during continuous operation or at determinable time intervals and being taken into account when determining the electromechanical efficiency or the change over time in the electromechanical efficiency. This embodiment is especially suitable for taking into account the presence of different temperatures at the first and at least at the second points in time at which the respective electromechanical efficiency is determined. Thus, a misdiagnosis can be prevented in case of a change over time in the electromechanical efficiency beyond the pre-definable threshold, based upon pure temperature effects. In order to take temperature effects into account, a polynomial function that describes electromechanical efficiency as a function of temperature can be used, for example.

The aim underlying the invention is further achieved by a device for determining and/or monitoring at least one process variable of a medium, which device comprises an electromechanical resonator with at least one piezoelectric element and is designed to carry out at least one method according to at least one of the preceding claims. The device is, for example, a vibronic sensor.

An electromechanical resonator comprises a resonator element suitable for performing mechanical vibrations, and an electromechanical transducer unit that is such that an electrical potential applied to the transducer unit, especially, a surface thereof, results in mechanical deformations of the transducer unit, and vice versa. In the case of the present invention, the electromechanical transducer unit comprises at least one piezoelectric element. The electromechanical resonator can be, on the one hand, an essentially single component, such as a ceramic resonator or an oscillating quartz crystal. However, it can also be, for example, a vibronic sensor, which comprises a drive/receiver unit in the form of an electromechanical converter unit and a mechanically-vibrating unit as a resonator element.

It should be noted that the embodiments in connection with the method according to the invention can also be applied mutatis mutandis to the device according to the invention.

BRIEF DESCRIPTION OF THE DRAWINGS

The invention along with its advantageous embodiments are described in more detail below using the figures, FIG. 1 and FIG. 2. The following is shown.

DETAILED DESCRIPTION

Figure 1:
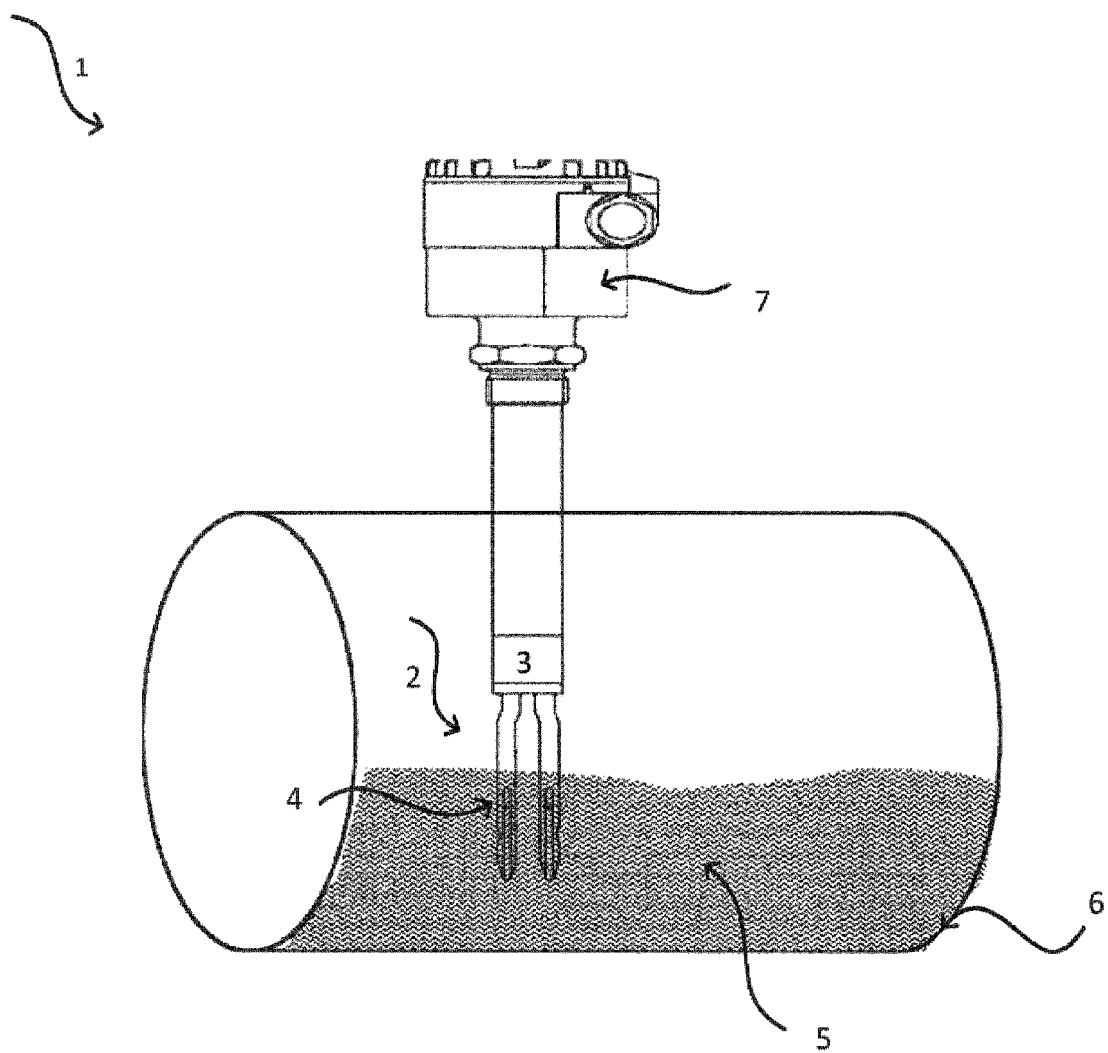
FIG. 1 shows a schematic illustration of a vibronic sensor.

For the sake of simplicity, the following description refers to a vibronic sensor 1, as shown in FIG. 1, without limiting the general nature of the present invention. The vibronic sensor 1 contains an electromechanical resonator 2, which is composed of a drive/receiver unit 3 in the form of an electromechanical converter unit with at least one piezoelectric element and one mechanically-vibrating unit 4. The drive/receiver unit 3 can be designed, for example, as a so-called "bimorph drive," in which at least one piezoelectric element is adhered to the mechanically-vibrating unit 4 in a firmly-bonded manner. However, it can also be a stack drive, which contains a force-fitting coupling to the vibrating unit 4. Additional embodiments of suitable drive/receiver units 3 for a vibronic sensor 1 are familiar to persons skilled in the art and also fall under the present invention.

For determination and/or monitoring, the vibrating unit 4 of the vibronic sensor 1 projects at least temporarily into a medium 5, which is located, for example, in a container 6, such as a reservoir or a pipe.

The vibrating unit 4 is excited to mechanical vibration via the drive/receiver unit 5 by means of an electrical excitation signal. Conversely, the mechanical vibrations of the vibrating unit 4 are received via the drive/receiver unit 3 in the form of an electrical incoming signal, and are evaluated with regard to the respective process variable. This occurs in a suitably designed electronics unit 7, which is used for signal acquisition, evaluation, and/or feed.

The amplitudes of the excitation signal and the incoming signal, or their ratio, play a significant role for many methods for determining and/or monitoring the respective process variables, especially the fill-level, density, and/or viscosity, which have become known in the context of vibronic sensors 1. Accordingly, a drift of such variables due to temperature and/or aging can lead to distortions in the determination of a measured value for the respective process variable.

The method according to the invention now makes it possible to detect a change in the amplitude of the excitation and/or incoming signal not caused by the respective measurement itself. Subsequently, a changed vibration behavior can either be compensated for in a suitable manner during the continuous operation of the respective sensor 1, or possibly defective components of sensor 1, especially of the electromechanical resonator 2, can be replaced.

In the case of a vibronic sensor 1 excited to resonant vibrations, the following steps are taken to determine the respective condition indicator:

The electromechanical efficiency at a point in time t for a resonant vibration with the natural frequency $\omega_{90}$ of the vibronic sensor 1 is determined by the amplification factor $V_{90}$ at the resonance frequency $\omega_{90}$ and the mechanical quality Q.

The amplification factor $V_{90}$, can, if the resonant vibration with the frequency or circular frequency $\omega_{90}$ is present, be determined from the ratio of the amplitudes of the excitation signal—here, in the form of an excitation voltage, $A_A$—and the incoming signal—here, in the form of a received voltage, $A_E$—i.e., in principle, on the basis of a transfer function G of the electromechanical resonator:

$$V_{90} = \left.\frac{A_E}{A_A}\right|_{\omega=\omega_{90}} = k(t) \cdot Q$$

The mechanical quality of the electromechanical resonator 2 can be determined, for example, from the gradient of the phase shift $\Delta\varphi$ between the excitation signal and the incoming signal as a function of a frequency $\omega_{90}$:

$$\left.\frac{d\varphi}{d\omega}\right|_{\omega=\omega_{90}} = \frac{2 \cdot Q}{\omega_{90}}$$

$$Q = \frac{\left.\frac{d\varphi}{d\omega}\right|_{\omega=\omega_{90}} \cdot \omega_{90}}{2}$$

In the case of a resonant vibration, there is a phase shift of $\Delta\varphi=-90°$ between the excitation signal and the incoming signal.

For the electromechanical efficiency, the following then applies:

$$k(t) = \frac{V_{90}}{Q} = \frac{2 \cdot \left.\left|\frac{A}{A_S}\right|\right|_{\omega=\omega_{90}}}{\left.\frac{d\varphi}{d\omega}\right|_{\omega=\omega_{90}} \cdot \omega_{90}}$$

The amplification factor $V_{90}$, and thus the accompanying vibration amplitude of the vibronic sensor 1, depends upon both the electromechanical efficiency k(t) and the quality Q.

In order to monitor the condition of the electromechanical resonator 2 in continuous operation, the electromechanical efficiency k(t) is determined at at least two points in time $t_1$ and $t_2$, and then a change over time in the electromechanical efficiency is determined from the difference $\Delta k(t)=k(t_1)-k(t_2)$. If the temporal change $\Delta k(t)$ is greater than a pre-definable threshold $\Delta k$, then, for example, an aging of at least one component of the electromechanical resonator can be derived. Furthermore, it is appropriate to directly determine the electromechanical efficiency $k(t_0)$ after the production of the resonator at the point in time to, and also, at such point in time, to specify the pre-definable threshold $\Delta k$ for the change in the electromechanical efficiency $\Delta k(t)$.

Figure 2:
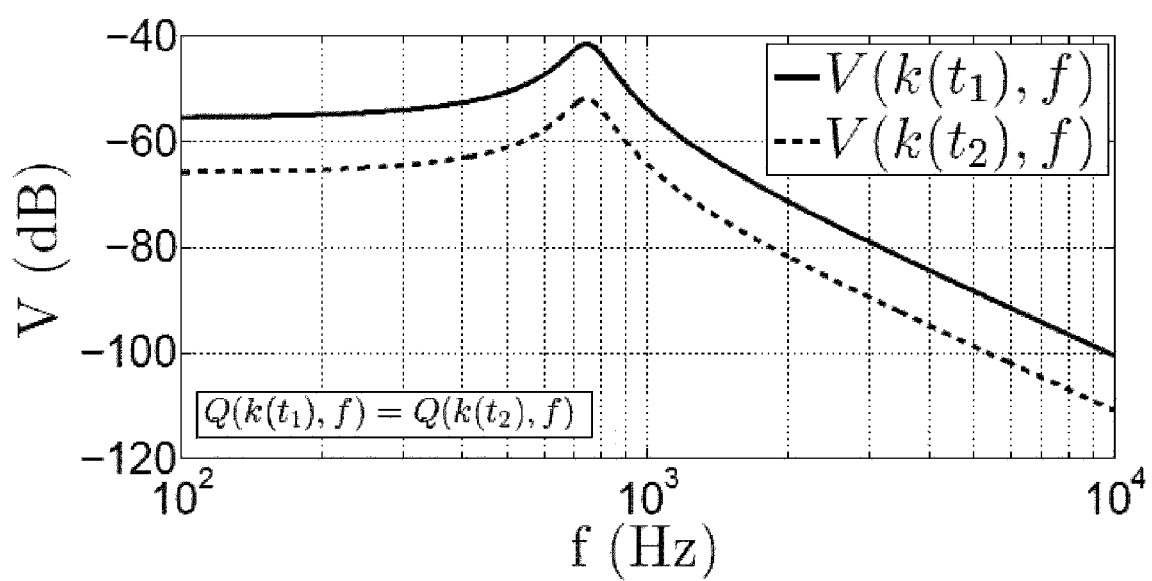
FIG. 2 shows a schematic diagram showing the change over time in the electromechanical efficiency as a function of the amplification factor and the quality.

FIG. 2 shows by way of example a diagram for changing the electromechanical efficiency as a function of the amplification factor and the quality of an electromechanical resonator 2. The amplification factor V is shown as a function of the frequency f for two different values $k(t_1)$ and $k(t_2)$ of the electromechanical efficiency. A change in the electromechanical efficiency thus causes a change in the amplification factor V over the entire frequency spectrum f. On the other hand, the quality Q of the electromechanical resonator 2 remains essentially unaffected by a change over time in the electromechanical efficiency, such that a change in the electromechanical efficiency $\Delta k(t)$ in the form of a condition indicator can be determined on the basis of the quality Q and the amplification factor V.

The invention claimed is:

1. A method for monitoring a condition of at least one component of an electromechanical resonator including a piezoelectric element that can be excited to mechanical vibration by an electrical excitation signal, wherein the mechanical vibration can be received in the form of an electrical incoming signal, the method comprising the following steps:
    at a first point in time:
        a. determining an amplification factor of the electromechanical resonator;
        b. determining a mechanical quality of the electromechanical resonator; and
        c. establishing an electromechanical efficiency of the electromechanical resonator based on the amplification factor and the mechanical quality;
    at least at a second point in time, repeating the steps a. through c.;
    calculating a change over time in the electromechanical efficiency based on a comparison of at least the electromechanical efficiency determined at a first point in time and the electromechanical efficiency determined at a second point in time;
    comparing the change in electromechanical efficiency with a predefined threshold; and
    determining a condition indicator from the comparison.

2. The method of claim 1, wherein the condition indicator is a measure for an aging of the at least one component and/or for a change in a vibration amplitude and/or a resonance frequency of the electromechanical resonator caused by the aging of the at least one component.

3. The method of claim 1, wherein the amplification factor is determined from a ratio of the excitation signal and the incoming signal.

4. The method of claim 3, wherein the excitation signal is an excitation voltage, and the incoming signal is a received voltage.

5. The method of claim 1, wherein the electromechanical resonator is excited to resonance vibrations at a resonance frequency.

6. The method of claim 1, wherein a predetermined phase shift between the excitation signal and the incoming signal is set for exciting the electromechanical resonator.

7. The method of claim 1, wherein the mechanical quality is determined based on:
    a gradient between the excitation signal and the incoming signal as a function of a frequency upon the presence of a resonance vibration with a resonance frequency of the electromechanical resonator;
    a temporal course of an amplitude of the incoming signal after switching off the excitation signal; or
    a modulation of the excitation signal.

8. The method of claim 1, wherein the electromechanical resonator includes a mechanically vibrating unit attached to the piezoelectric element in a force-fit and/or adhesively bonded manner, and wherein an aging of the piezoelectric element and/or of an adhesive, via which adhesive the piezoelectric element is bonded to the vibrating unit, is derived from a change in the electromechanical efficiency beyond the predefined threshold.

9. The method of claim 8, wherein the mechanically vibrating unit is a diaphragm, a single rod, or a tuning fork.

10. The method of claim 1, wherein the incoming signal further is used to determine at least one process variable of a medium in a container.

11. The method of claim 10, wherein the at least one process variable of the medium is a fill-level, a density, or a viscosity of the medium.

12. The method of claim 1, wherein the electromechanical efficiency or the change over time in the electromechanical efficiency is determined at least part using an ambient temperature, which is determined during continuous operation of the electromechanical resonator or at determined time intervals.

13. A device for determining and/or monitoring at least one process variable of a medium, the device comprising:
   an electromechanical resonator including at least one piezoelectric element; and
   an electronics unit configured to:
      at a first point in time:
         a. determine an amplification factor of the electromechanical resonator;
         b. determine a mechanical quality of the electromechanical resonator; and
         c. establish an electromechanical efficiency of the electromechanical resonator based on the amplification factor and the mechanical quality;
      at least at a second point in time, repeating the steps a. through c.;
      calculate a change over time in the electromechanical efficiency based on a comparison of at least the electromechanical efficiency determined at a first point in time and the electromechanical efficiency determined at a second point in time;
      compare the change in electromechanical efficiency with a predefined threshold; and
      determine a condition indicator from the comparison.

* * * * *